United States Patent
Shensa

[11] Patent Number: 5,926,507
[45] Date of Patent: Jul. 20, 1999

[54] QUOTIENT CODING MODEM

[75] Inventor: Mark J. Shensa, San Diego, Calif.

[73] Assignee: The United States of America as represented by the Secretary of the Navy, Washington, D.C.

[21] Appl. No.: 08/889,266

[22] Filed: Jul. 8, 1997

Related U.S. Application Data

[51] Int. Cl.[6] .......................................... H04B 1/38
[52] U.S. Cl. ........................ 375/222; 375/261; 375/298; 332/103; 329/304
[58] Field of Search ..................... 375/222, 223, 375/261, 295, 298, 324, 340; 332/103; 329/304

[56] References Cited

U.S. PATENT DOCUMENTS

| | | | |
|---|---|---|---|
| 4,388,697 | 6/1983 | Breen et al. | 375/222 |
| 4,613,975 | 9/1986 | Aoyagi et al. . | |
| 4,700,151 | 10/1987 | Nagata . | |
| 4,816,783 | 3/1989 | Leitch . | |
| 5,050,189 | 9/1991 | Cox et al. | 375/223 |
| 5,168,509 | 12/1992 | Nakamura et al. . | |
| 5,230,010 | 7/1993 | Betts et al. . | |
| 5,379,324 | 1/1995 | Mueller et al. | 375/340 |
| 5,396,656 | 3/1995 | Jasper et al. . | |
| 5,483,557 | 1/1996 | Webb . | |
| 5,586,147 | 12/1996 | Kreuzgruber et al. . | |

OTHER PUBLICATIONS

Technical Report 1729 "Quotient Quadrature Amplitude Modulation (QQAM) for Fading Channels", Oct. 1996 M.J. Shensa.

*Primary Examiner*—Temesghen Ghebretinsae
*Assistant Examiner*—Lenny Jiang
*Attorney, Agent, or Firm*—Harvey Fendelman; Michael A. Kagan; Eric James Whitesell

[57] ABSTRACT

A quotient coding modem comprises a modulator that encodes transmitted symbols by the equation $$q(t) = \begin{cases} q(t-1)s(t) & \text{if } |q(t-1)s(t)| \leq \sqrt{P_{max}} \\ q(t-1)/\overline{s(t)} & \text{if } |q(t-1)s(t)| > \sqrt{P_{max}} \end{cases}$$

and a demodulator that decodes received symbols by the equation $$s_r(t) = \begin{cases} q_r(t)\overline{q_r(t-1)}/P_r(t-1) & \text{if } P_r(t) \geq \eta^2 P_r(t-1) \\ q_r(t)\overline{q_r(t-1)}/P_r(t) & \text{if } P_r(t) < \eta^2 P_r(t-1) \end{cases}$$

where $q(t)$ and $q_r(t)$ are functions of time for transmitted and received symbols $s(t)$ and $s_r(t)$ respectively at time t, $P_r(t) = |q_r(t)|^2$ is instantaneous received baseband power at time t, $\eta$ is a function of the two smallest symbol amplitudes, and $P_{max}$ is peak transmitted power.

14 Claims, 5 Drawing Sheets

QUOTIENT CODING MODEM

LICENSING INFORMATION

The invention described below is assigned to the United States Government and is available for licensing commercially. Technical and licensing inquiries may be directed to Harvey Fendelman, Patent Counsel, SPAWAR Systems Center San Diego, Code D0012, 53510 Silvergate Avenue Room 103, San Diego, Calif. 92152-5765; telephone no. (619)553-3818; fax no. (619)553-3821.

BACKGROUND OF THE INVENTION

The present invention relates to communications signal modulators for improving signal bandwidth in a medium subject to channel fading. More specifically, but without limitation thereto, the present invention relates to a modulator/demodulator for mitigating the effects of channel fading on the amplitude and phase of MQAM communications symbols.

Multiplicative Rayleigh channel fading is a frequent problem in wireless communications. A standard technique for combating such channel instabilities is differential coding. In addition to possessing a reduced sensitivity to channel effects, differentially encoded signals do not require synchronization for suppressed carriers. Thus, they avoid additional noise from devices such as phase-locked loops. Differential encoding is particularly effective when the basic modulation is M-ary phase shift keying (MPSK) in which case it is labeled DPSK (differential MPSK). On the other hand, if the channel is relatively benign and fading is not an issue, one may obtain higher bit rates (as well as an improved SNR performance over MPSK) for an equivalent bandwidth by using M-ary quadrature amplitude modulation (MQAM). A variation, particulary used to combat multiplicative Rayleigh fading while still retaining MQAM, is differential MQAM (i.e., DQAM). In the case of DQAM, the differential encoding removes, or at least mitigates, the effects of channel fading upon the phase component of the MQAM signal. However, the amplitude is still vulnerable to the channel, and one must resort to approximate techniques such as automatic gain control to estimate the magnitude of fading and to extract symbol amplitude. Such methods fail if the fade rate becomes too large. That is, they suffer from a trade-off between the quality of the channel estimation and the speed at which it is tracked. The following examples further clarify the problem of channel fading.

M-ary phase shift keying (MPSK) symbols may be expressed by the formula $$s = A e^{2\pi j(m-1)/M} = A e^{j\phi_m} \tag{1a}$$

where

A is real, $\phi_m$ is $2\pi j(m-1)/M$; $m=1, \ldots, M$; \hfill (1b)

and

M is the total number of symbols to be encoded.

A received symbol subjected to multiplicative channel fading may be modeled as $\alpha(t)s(t)+n(t)$, where $\alpha(t)$ is a complex function of time t corresponding to channel amplitude and phase distortion caused by channel fading, s(t) is a symbol received at time t, and n(t) is channel noise at time t.

An estimate of the phase of $\alpha$ may be used to demodulate the MPSK signal, but a rapidly fading channel makes such estimates difficult. Alternatively, the modulation technique may be modified to use a differential MPSK (DPSK) signal $$d(t) = A_d(t)e^{j\phi(t)}, \tag{2}$$

where $A_d(t)$ is the amplitude at time t, and $\theta(t)$ is the phase at time t.

Also, d(0) may be assumed known, e.g. d(0)=1, and the current value of d(t) may be defined as a function of its previous value d(t−1) and the current symbol s(t) from equation (1a) by $$d(t) = A_d(t-1)e^{j(\phi(t)+\theta(t-1))} s(t)d(t-1)/A \tag{3}$$

Note that in this case, $|d(t)|=|s(t)/A|$ $|d(t-1)|=|d(t-1)|$, i.e., $|d(t)|$ is constant. The phase of symbol s(t) may be recovered from the phase of received signal $d_r(t)$ times the complex conjugate of $d_r(t-1)$:

$$\text{phase}(s(t)) = \text{phase}(d_r(t)\overline{d_r(t-1)}) \tag{4}$$

The phase shift of symbol s(t) is independent of the fading channel to the extent that the phase shift due to the channel given by $\text{phase}(\alpha(t)\overline{\alpha(t-1)})$ is approximately zero as follows. Since $\alpha(t)$ is approximately $\alpha(t-1)$, $$\alpha(t)\overline{\alpha(t-1)}\alpha(t)\overline{\alpha(t)} \approx |\alpha(t)|^2$$

which has zero phase.

MQAM symbols are a combination of amplitude and phase modulation, i.e., $$s = A_n e^{2\pi j(p-1)/P} = A_n e^{j\theta_p} \tag{5}$$

where n=1, . . . ,N, and p=1, . . . ,P.

DQAM is typically implemented by differentially encoding the phase:

$$d(t) = s(t)d(t-1)/\|d(t-1)\|, \tag{6a}$$

and recovering the symbol by $$s_r(t) = d_r(t)\frac{\overline{d_r(t-1)}}{\|d_r(t-1)\|} \tag{6b}$$

The phase of $s_r(t)$ is virtually independent of channel fading as described above, but the received amplitude $|s_r(t)|=|\alpha(t) s(t)|$ requires channel estimation to extract the amplitude of transmitted symbol s(t). This may be done by averaging techniques such as automatic gain control (AGC), but there is a performance tradeoff between averaging over enough symbols to smooth out the dependence on $A_n$ and a short enough time period to track the fading channel.

A continuing need therefore exists for an effective method to mitigate the effects of channel fading on both symbol amplitude and phase.

SUMMARY OF THE INVENTION

A quotient coding modem of the present invention is directed to overcoming the problems described above, and may provide further related advantages. No embodiment of the present invention described herein shall preclude other embodiments or advantages that may exist or become obvious to those skilled in the art.

A quotient coding modem of the present invention comprises a modulator that encodes transmitted symbols by the equation $$q(t) = \begin{cases} q(t-1)s(t) & \text{if } |q(t-1)s(t)| \leq \sqrt{P_{max}} \\ q(t-1)/\overline{s(t)} & \text{if } |q(t-1)s(t)| > \sqrt{P_{max}} \end{cases}$$

and a demodulator that decodes received symbols by the equation $$s_r(t) = \begin{cases} q_r(t)\overline{q_r(t-1)}/P_r(t-1) & \text{if } P_r(t) \geq \eta^2 P_r(t-1) \\ q_r(t)\overline{q_r(t-1)}/P_r(t) & \text{if } P_r(t) < \eta^2 P_r(t-1) \end{cases}$$

where q(t) and $q_r(t)$ are functions of time for transmitted and received symbols s(t) and $s_r(t)$ respectively at time t, $P_r(t) = |q_r(t)|^2$ the instantaneous received baseband power at time t, $\eta$ is a decision threshold function of the two smallest symbol amplitudes, and $P_{max}$ is peak transmitted power.

An advantage of the quotient coding modem is that both the amplitude and the phase of a transmitted symbol subject to the effects of channel fading may be recovered from the received symbol.

Another advantage is that the overall bit error probability including the effects of channel fading may be improved without increasing signal power or bandwidth.

Still another advantage is that the quotient coding modem of the present invention may be applied as effectively to MQAM signals to suppress the effects of channel fading with respect to the entire symbol as DPSK is for the phase alone.

The features and advantages summarized above in addition to other aspects of the present invention will become more apparent from the description, presented in conjunction with the following drawings.

DESCRIPTION OF THE INVENTION

Figure 1:
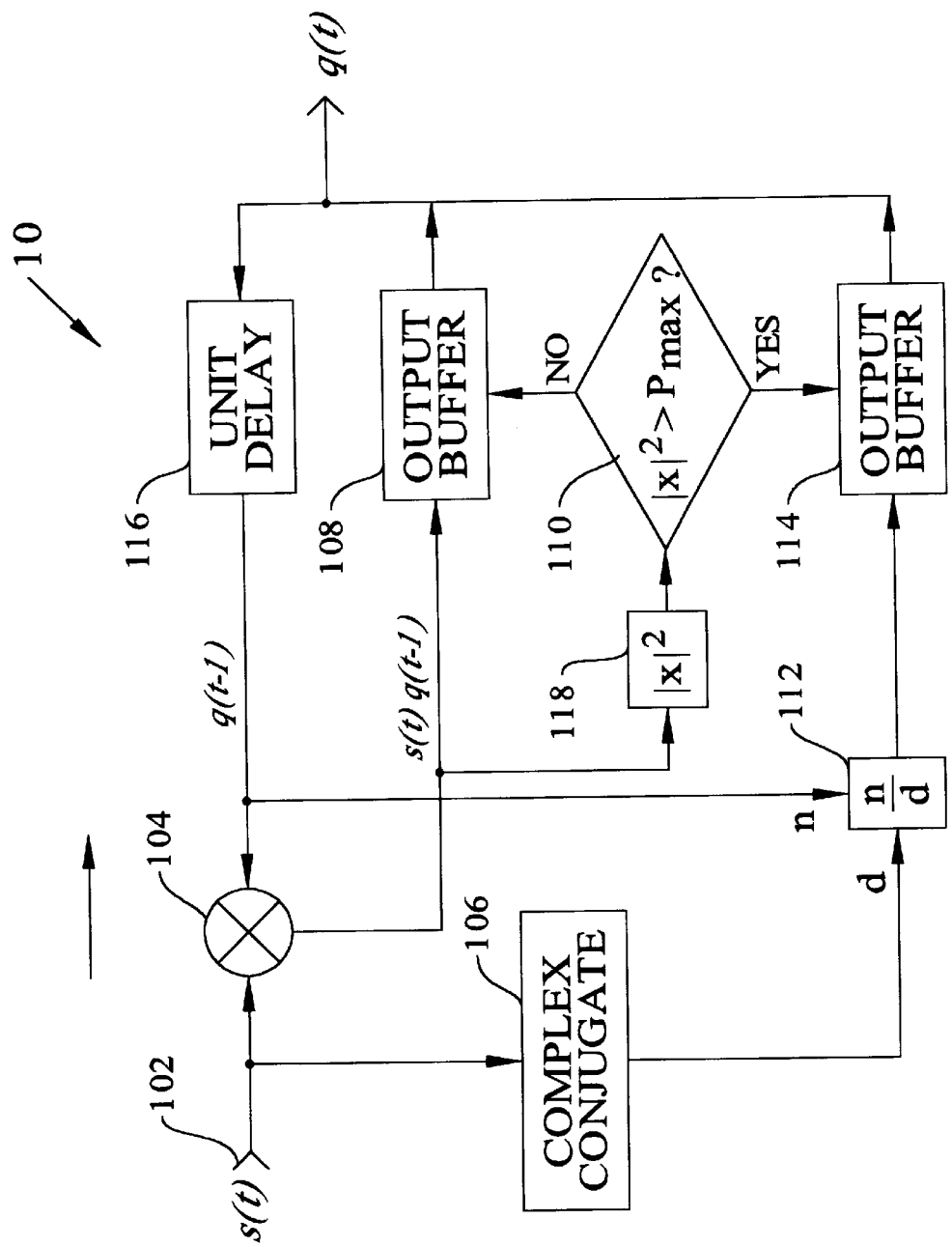
FIG. 1 is a diagram of a quotient coding modulator of the present invention.

The following description is presented solely for the purpose of disclosing how the present invention may be made and used. The scope of the invention is defined by the claims.

A basic paradigm for quotient quadrature amplitude modulation (QQAM) of the present invention is $$x(t) = s(t)q(t-1) \tag{7a}$$

for the modulator and $$s_r(t) = x_r(t)/x_r(t-1) \tag{7b}$$

for the demodulator, where x(t) and $x_r(t)$ are recursive quotient functions of time for transmitted and received symbols s(t) and $s_r(t)$ respectively. The multiplicative channel effects cancel out with respect to both phase and amplitude as shown by $$x_r(t) = \alpha(t)x(t) \tag{8}$$

$$x_r(t-1) = \alpha(t-1)x(t-1)$$

$$s_r(t) = x_r(t)/x_r(t-1)$$

$$= (\alpha(t)x(t))/(\alpha(t-1)x(t-1))$$

$$= (\alpha(t)/\alpha(t-1))(x(t)/x(t-1))$$

$$\approx x(t)/x(t-1)$$

A practical difficulty associated with equation (7a) is that if $|s(t)| \neq 1$, the transmitted power may experience large excursions caused by the variation in the amplitude of the transmitted symbol. In particular, $$|x(t)| = |\Pi_{t_i < t} s(t_i)||x(0)|$$

The excursions may average out to a reasonable power level, but are still likely to result in long sequences having symbols with extremely small or extremely large transmitted power. The former is sensitive to noise; the latter physically impractical. However, the dynamic range problem may be solved by modifying the quotient functions as described below.

Referring to the MQAM modulation exemplified in equation (5), the symbols may be ordered by amplitude without loss of generality:

$$A_1 < A_2 \ldots < A_N \tag{9a}$$

and normalized so that $$A_1 = 1. \tag{9b}$$

The actual quotient coder modulator may be defined by $$q(t) = \begin{cases} q(t-1)s(t) & \text{if } |q(t-1)s(t)| \leq \sqrt{P_{max}} \\ q(t-1)/\overline{s(t)} & \text{if } |q(t-1)s(t)| > \sqrt{P_{max}} \end{cases} \tag{10}$$

A reasonable initialization value is $$q(-1) = \sqrt{P_{max}}/2.0$$

where $P_{max}$ is the maximum transmission power at baseband. The instantaneous power $P_r(t)$ may be defined as $$P_r(t) \triangleq |q_r(t)|^2 \tag{11}$$

Note that in the absence of noise, $P_r(t)/P_r(t-1)$ is essentially independent of multiplicative fading $\alpha(t)$, and that $P_r(t)$ equals $|s(t)|^2$ or $1/|s(t)|^2$ according to equation (10). Since $A_1 = 1 > A_2/2$, the two power ratios may be divided into two populations, $\sqrt{P_r(t)/P_r(t-1)} \geq A_1$ and $\sqrt{P_r(t)/P_r(t-1)} \leq 1/A_2$. The midpoint of these two populations may be defined as $$\eta \triangleq 0.5(A_1 + 1/A_2) = 0.5(1 + 1/A_2) \tag{12}$$

The quotient coding demodulator may then be expressed as $$s_r(t) = \begin{cases} q_r(t)/q_r(t-1) & \text{if } P_r(t) \geq \eta^2 P_r(t-1) \\ \overline{q_r(t-1)/q_r(t)} & \text{if } P_r(t) < \eta^2 P_r(t-1) \end{cases} \tag{13}$$

which may also be written as $$s_r(t) = \begin{cases} q_r(t)/\overline{q_r(t-1)}/P_r(t-1) & \text{if } P_r(t) \geq \eta^2 P_r(t-1) \\ q_r(t)\overline{q_r(t-1)}/P_r(t) & \text{if } P_r(t) < \eta^2 P_r(t-1) \end{cases} \quad (14)$$

FIG. 1 is an exemplary embodiment of a quotient coding modulator 10. Symbol input 102 inputs symbol stream s(t) to modulator multiplier 104 and to modulator complex conjugator 106. Multiplier 104 outputs the product s(t)q(t−1) to a first modulator output buffer 108 and to modulator magnitude squarer 118. Modulator magnitude squarer 118 outputs $|s(t)q(t-1)|^2$ to the input of comparator 110. Modulator complex conjugator 106 outputs the complex conjugate of s(t) to the denominator input of modulator divider 112. Modulator divider 112 outputs the quotient of q(t−1) divided by the complex conjugate of s(t) to a second modulator output buffer 114. Comparator 110 compares $|s(t)q(t-1)|^2$ with a modulator decision threshold set at, for example, $P_{max}$ and enables output buffer 108 if $|s(t)q(t-1)|^2$ is less than or equal to $P_{max}$, or output buffer 114 if $|s(t)q(t-1)|^2$ is greater than $P_{max}$. Output buffers 108 and 114 may be implemented as, for example, three-state buffers or 2-to-1 demultiplexers. The output of the enabled output buffer is input as q(t) to modulator unit delay 116. Modulator unit delay 116 outputs q(t−1) to modulator multiplier 104.

Figure 2:
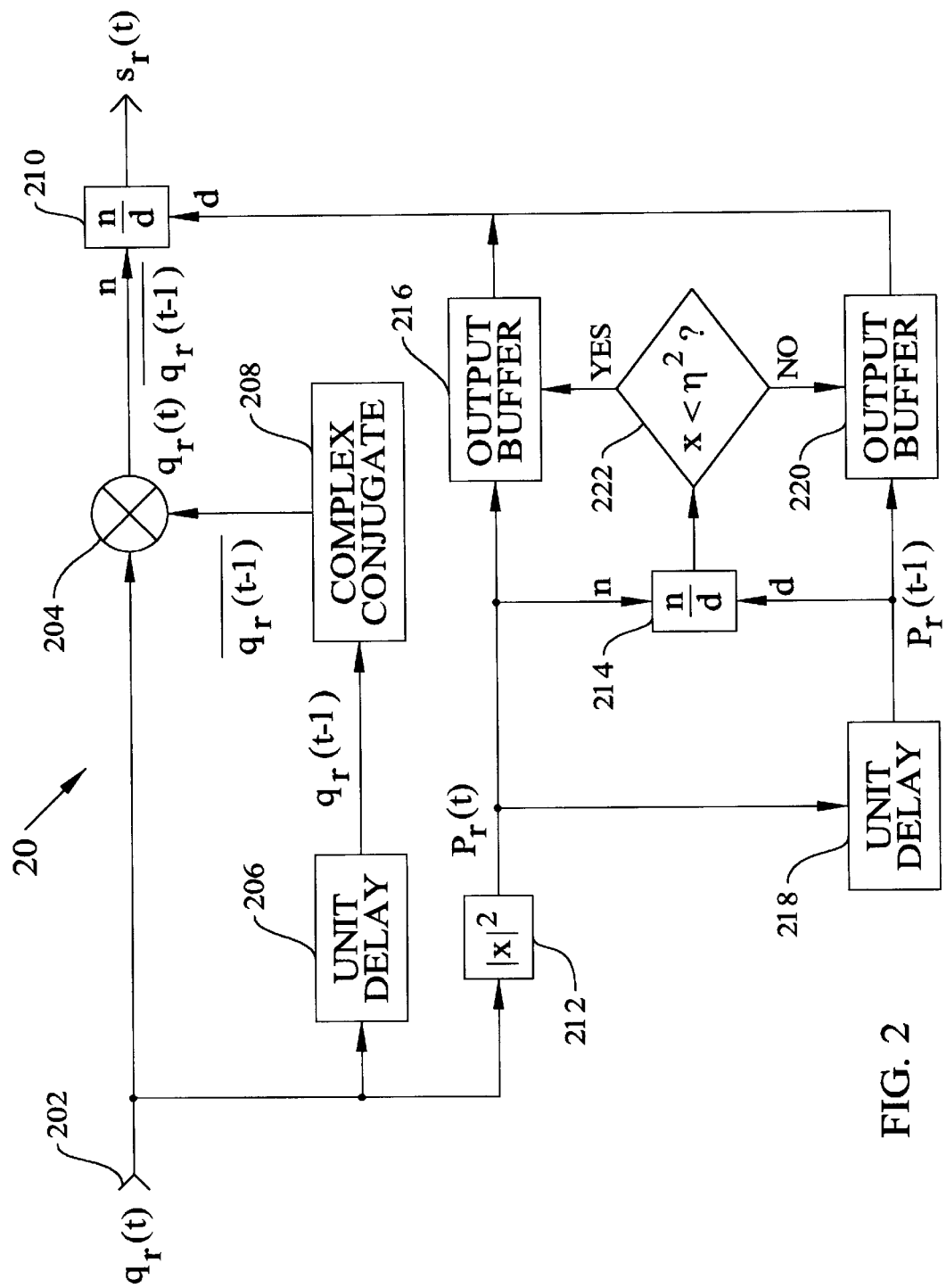
FIG. 2 is a diagram of a quotient coding demodulator of the present invention.

FIG. 2 is an exemplary embodiment of a quotient coding demodulator 20. Encoded symbol input 202 inputs encoded symbol stream $q_r(t)$ to demodulator multiplier 204, first demodulator unit delay 206, and demodulator magnitude squarer 212. Unit delay 206 outputs $q_r(t-1)$ to demodulator complex conjugator 208. Complex conjugate $\overline{q_r(t-1)}$ is output from complex conjugator 208 to multiplier 204. Multiplier 204 outputs the product $q_r(t)\overline{q_r(t-1)}$ to first demodulator divider 210. Magnitude squarer 212 outputs $|q_r(t)|^2 = P_r(t)$ instantaneous received baseband power to second demodulator unit delay 218, second demodulator divider 214, and first demodulator output buffer 216. Unit delay 218 outputs $P_r(t-1)$ to divider 214 and second demodulator output buffer 220. Divider 214 outputs the power ratio $P_r(t)/P_r(t-1)$ to demodulator comparator 222. Demodulator comparator 222 compares the power ratio to a demodulator decision threshold of, for example, $\eta^2$, defined in equation (12). If the power ratio is less than the threshold, comparator 222 enables output buffer 216. If the power ratio is greater than or equal to the threshold, comparator 222 enables output buffer 220. The output of the enabled output buffer is input to divider 210. The quotient of $q_r(t)\overline{q_r(t-1)}$ divided by the output of the enabled output buffer is output as decoded symbol $s_r(t)$.

Figure 3:
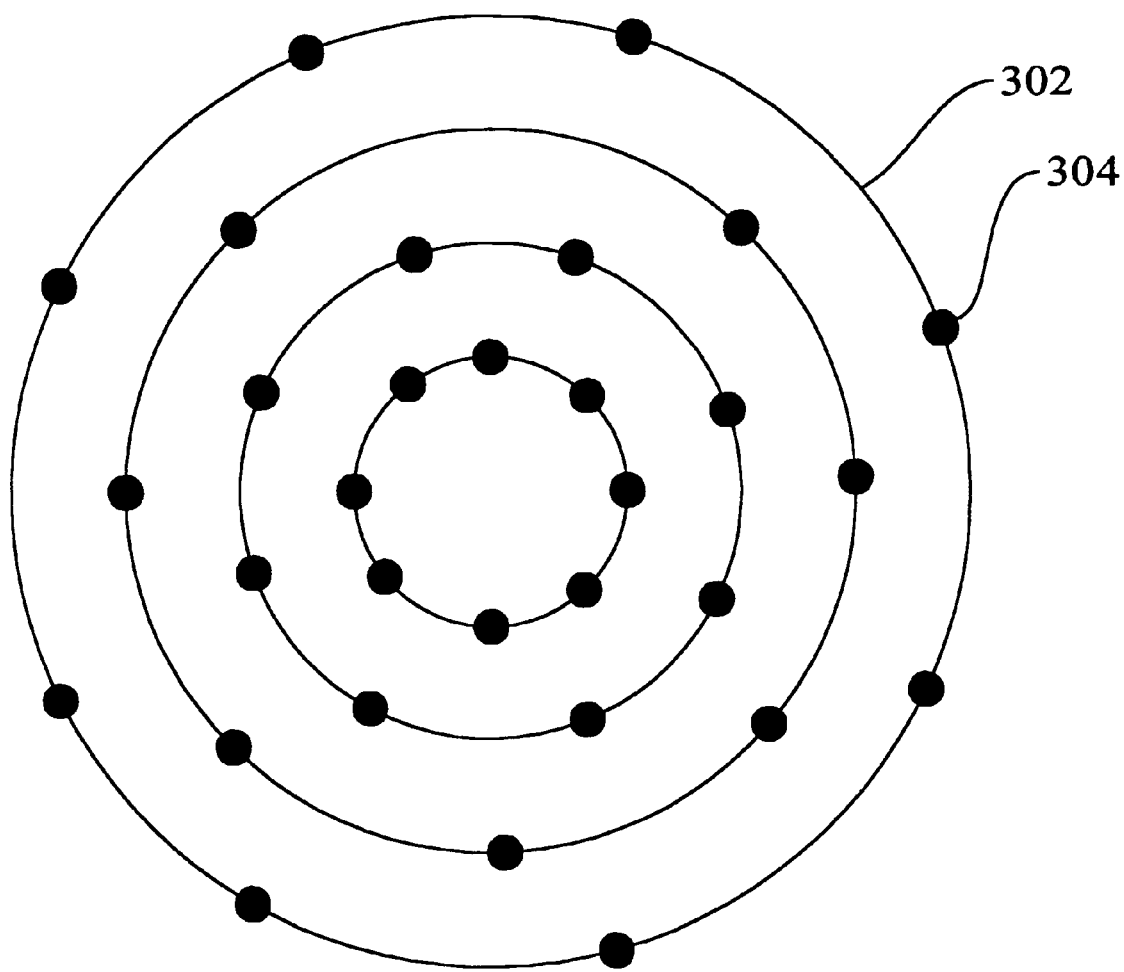
FIG. 3 is a diagram of a constellation of 32 symbol quotient quadrature amplitude modulation (32QQAM) using two amplitude bits and three phase bits.

FIG. 3 illustrates a constellation of an example of 32 symbol quotient coded amplitude modulation with two amplitude bits and three phase bits. In this example, rings 302 are equally spaced in amplitude with amplitudes 304 generated from the formula $A_i = 1 + 0.4(i-1)$ Typically, the symbols of each ring 302 are assigned by Gray coding. Gray coding is a standard mapping according to which adjacent symbols differ by one binary digit. This improves the error rate since a mistaken neighbor causes an error of only one bit. The factor of 0.4 was obtained experimentally without any special effort to optimize the constellation. Other geometries may be better suited to different applications.

The constellation of FIG. 3 has been used to compare DQAM with the QQAM example. An AGC with an exponential window was used with DQAM to handle fading. More precisely, the channel was tracked by $$P_{av}(t_i) = (1-\lambda)P_{av}(t_i-1) + \lambda|d_r(t)|^2$$

where $P_{av}$ is the estimated average power. A value of 
$\lambda = 1/40 = 0.025$
was chosen to correspond to a window of 40 symbols. This value of $\lambda$ was originally determined by optimizing performance for a fade rate of 0.0018 normalized Doppler, where the normalized maximum Doppler frequency is defined as $f_d/f_{symbol} = $max_doppler_frequency/symbol_rate.

This choice of $\lambda$ was found to be close to optimal even for very slow fading (fade rates of $10^{-5}$ and possibly lower). The window is about as short as can be used while still averaging sufficiently over the four possible amplitudes.

Figure 4:
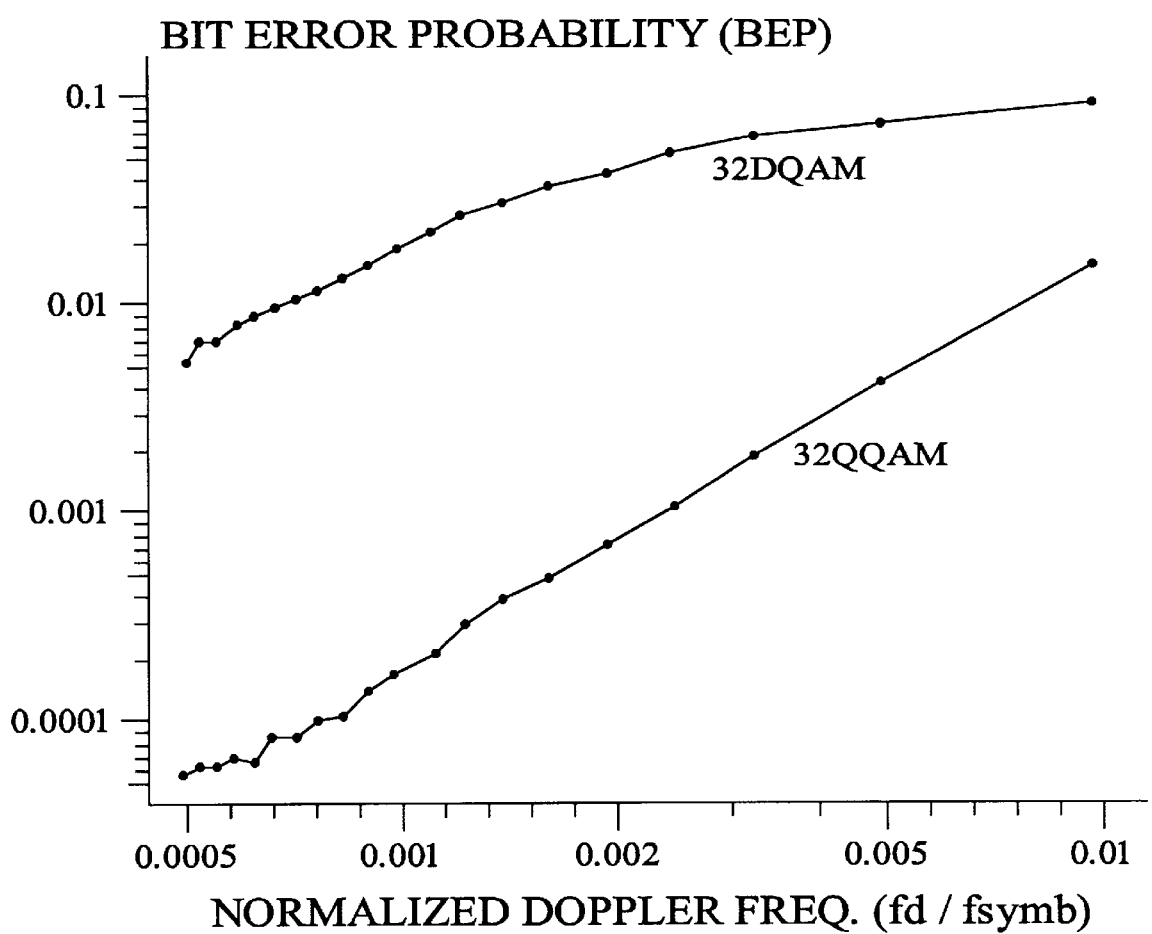
FIG. 4 is an exemplary plot of bit error rate versus normalized Doppler for 32QQAM and 32DQAM.

FIG. 4 is a plot of bit error probability versus normalized Doppler with no additive noise for the 32QQAM and 32DQAM examples discussed above. The superior performance of QQAM is clearly evident.

Figure 5:
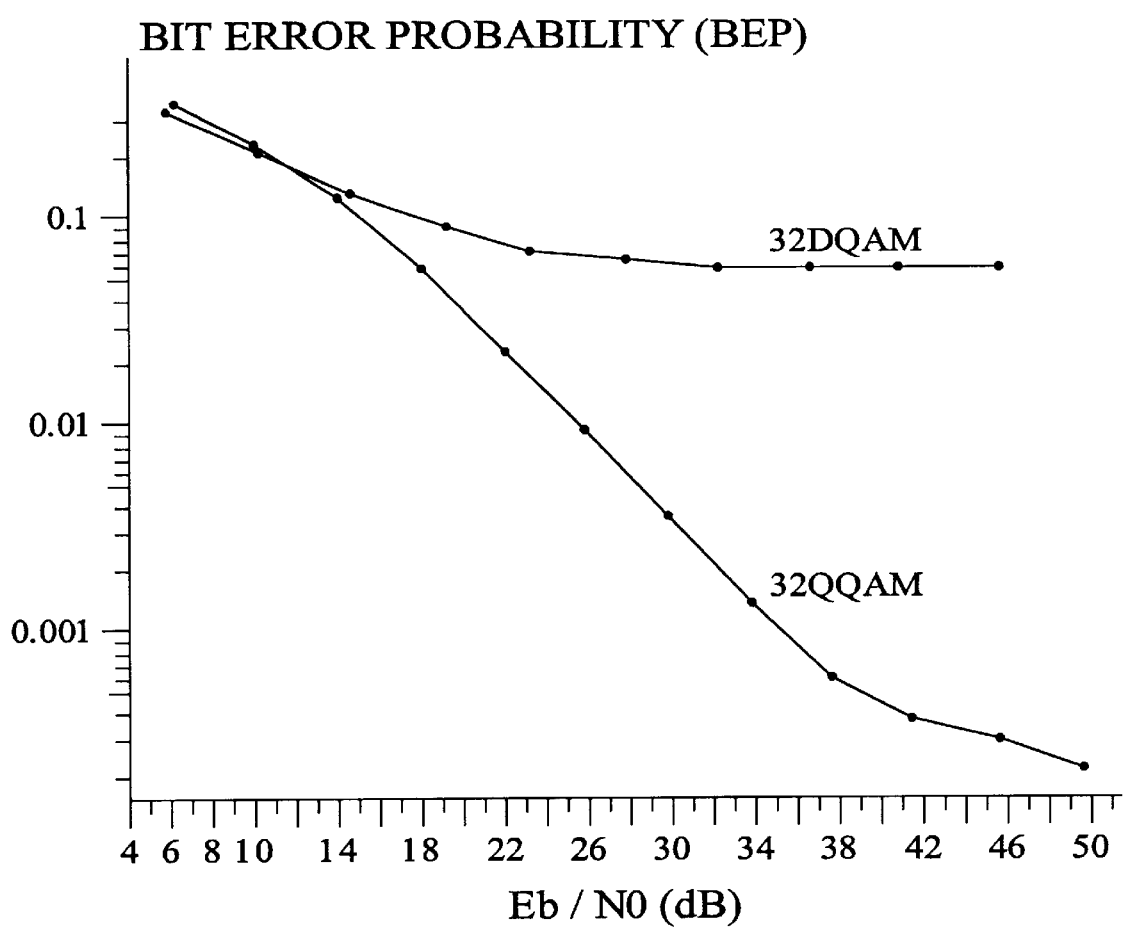
FIG. 5 is a an exemplary plot of bit error rate versus signal-to-noise per bit for 32QQAM and 32DQAM.

FIG. 5 is a plot of bit error probability as a function of signal-to-noise per bit for the same examples of QQAM and DQAM described above in which the normalized Doppler is fixed at 0.0018. At low SNR, DQAM performs slightly better than QQAM, but past the crossover point of about 12 db, QQAM gains dramatically in performance over DQAM, which saturates at about 30 db.

The exemplary quotient coding modem shown in FIGS. 1 and 2 may be used as both a hardware block diagram for discrete implementations and as a software flowchart for implementing the quotient coding modem in a computer program.

Other modifications, variations, and applications of the present invention may be made in accordance with the above teachings other than as specifically described to practice the invention within the scope of the following claims.

I claim:

1. A quotient coding modem comprising:
   a modulator for encoding a communications symbol comprising:
      a symbol input for receiving said communications symbol;
      a modulator multiplier having a multiplier input coupled to said symbol input;
      a first modulator output buffer coupled to an output of said modulator multiplier;
      a modulator unit delay coupled to a multiplicand input of said modulator multiplier;
      a modulator magnitude squarer coupled to said modulator multiplier output;
      a modulator complex conjugator coupled to said symbol input;
      a modulator divider having a numerator input coupled to said modulator unit delay and a denominator input coupled to said modulator complex conjugator;
      a second modulator output buffer coupled to an output of said modulator divider;
      a modulator comparator having an input coupled to said modulator magnitude squarer, a negative output coupled to an enable of said first modulator output buffer, and an affirmative output coupled to an enable of said second modulator output buffer;
      and a quotient coded symbol output coupled to an output of said first modulator output buffer, an output of said second modulator output buffer, and to said modulator unit delay;

and a demodulator for decoding said quotient coded symbol comprising:
a quotient coded symbol input;
a demodulator multiplier having a multiplier input coupled to said quotient coded symbol input;
a first demodulator unit delay coupled to said quotient coded symbol input;
a demodulator complex conjugator coupled to said first demodulator unit delay having an output coupled to a multiplicand input of said demodulator multiplier;
a demodulator magnitude squarer coupled to said quotient coded symbol input;
a first demodulator output buffer having an input coupled to said demodulator magnitude squarer;
a second demodulator unit delay having an input coupled to said demodulator magnitude squarer;
a second demodulator output buffer having an input coupled to said second demodulator unit delay;
a first demodulator divider having a numerator input coupled to said demodulator magnitude squarer and a denominator input coupled to said second demodulator unit delay;
a demodulator comparator having an input coupled to said first demodulator divider, an affirmative output coupled to an enable of said first demodulator output buffer, and a negative output coupled to an enable of said second demodulator output buffer;
a second demodulator divider having a numerator input coupled to said demodulator multiplier, a denominator input coupled to said first demodulator output buffer and said second demodulator output buffer;
and a quotient decoded symbol output coupled to an output of said second demodulator divider.

2. A quotient coding modulator for encoding a communications symbol comprising:
a symbol input for receiving said communications symbol;
a modulator multiplier having a multiplier input coupled to said symbol input;
a first modulator output buffer coupled to an output of said modulator multiplier;
a modulator unit delay coupled to a multiplicand input of said modulator multiplier;
a modulator magnitude squarer coupled to said modulator multiplier output;
a modulator complex conjugator coupled to said symbol input;
a modulator divider having a numerator input coupled to said modulator unit delay and a denominator input coupled to said modulator complex conjugator;
a second modulator output buffer coupled to an output of said modulator divider;
a modulator comparator having an input coupled to said modulator magnitude squarer, a negative output coupled to an enable of said first modulator output buffer, and an affirmative output coupled to an enable of said second modulator output buffer;
and a quotient coded symbol output coupled to an output of said first modulator output buffer, an output of said second modulator output buffer, and to said modulator unit delay.

3. A quotient coding demodulator for decoding an encoded symbol comprising:
a quotient coded symbol input;
a demodulator multiplier having a multiplier input coupled to said quotient coded symbol input;
a first demodulator unit delay coupled to said quotient coded symbol input;
a demodulator complex conjugator coupled to said first demodulator unit delay having an output coupled to a multiplicand input of said demodulator multiplier;
a demodulator magnitude squarer coupled to said quotient coded symbol input;
a first demodulator output buffer having an input coupled to said demodulator magnitude squarer;
a second demodulator unit delay having an input coupled to said demodulator magnitude squarer;
a second demodulator output buffer having an input coupled to said second demodulator unit delay;
a first demodulator divider having a numerator input coupled to said demodulator magnitude squarer and a denominator input coupled to said second demodulator unit delay;
a demodulator comparator having an input coupled to said first demodulator divider, an affirmative output coupled to an enable of said first demodulator output buffer, and a negative output coupled to an enable of said second demodulator output buffer;
a second demodulator divider having a numerator input coupled to said demodulator multiplier, a denominator input coupled to said first demodulator output buffer and said second demodulator output buffer;
and a quotient decoded symbol output coupled to an output of said second demodulator divider.

4. A quotient coding modem comprising a modulator that encodes transmitted symbols substantially according to the equation $$q(t) = \begin{cases} q(t-1)s(t) & \text{if } |q(t-1)s(t)| \le \sqrt{P_{\max}} \\ q(t-1)/\overline{s(t)} & \text{if } |q(t-1)s(t)| > \sqrt{P_{\max}} \end{cases}$$

and a demodulator that decodes received symbols substantially according to the equation $$s_r(t) = \begin{cases} q_r(t)\overline{q_r(t-1)}/P_r(t-1) & \text{if } P_r(t) \ge \eta^2 P_r(t-1) \\ q_r(t)\overline{q_r(t-1)}/P_r(t) & \text{if } P_r(t) < \eta^2 P_r(t-1) \end{cases}$$

where $q(t)$ and $q_r(t)$ are functions of time for transmitted and received symbols $s(t)$ and $s_r(t)$ respectively at time t, $P_r(t)$ is received power at time t, $\eta$ is a function of two symbol amplitudes, $P_r(t-1)$ is received power at time $t-1$, and $P_{max}$ is peak transmitted symbol power.

5. The quotient coding modulator of claim 2 wherein said modulator comparator has a decision threshold substantially equal to peak transmitted power $P_{max}$.

6. The quotient coding modulator of claim 4 wherein $q(-1)$ is substantially equal to $\sqrt{(P_{\max})}/2$.

7. The quotient coding demodulator of claim 3 wherein said demodulator comparator has a decision threshold that is a function of two symbol amplitudes and received baseband power.

8. The quotient coding demodulator of claim 7 wherein said two symbol amplitudes are two smallest symbol amplitudes A within a set of MQAM symbols defined by $s=A_n e^{2\pi j(p-1)/P}=A_n e^{j\theta_p}$.

9. A computer program product comprising:
a medium for embodying a computer program for input to a computer; and
a computer program embodied in said medium for causing the computer to perform the following functions for quotient coding modulation:

inputting a communications symbol value;
multiplying the communications symbol value by a delayed quotient coded symbol value to generate a first modulator output symbol value;
calculating a magnitude squared value of the first modulator output symbol value to generate a transmitted symbol power value;
calculating a complex conjugate of the communications symbol value;
dividing the delayed quotient coded symbol value by the complex conjugate of the communications symbol value to generate a second modulator output symbol value;
comparing the transmitted symbol power value with a modulator decision threshold;
selecting one of the first modulator output symbol value and the second modulator output symbol value;
outputting the selected output symbol value as the quotient coded symbol value;
and delaying the quotient coded symbol value by one time unit;
and for causing the computer to perform the following functions for quotient coding demodulation:
inputting a quotient coded symbol value;
delaying the quotient coded symbol value by one time unit;
calculating a complex conjugate of the delayed quotient coded symbol value;
multiplying the complex conjugate of the delayed quotient coded symbol value by the quotient coded symbol value to generate a quotient coded symbol product;
squaring the magnitude of the quotient coded symbol value to generate a received symbol power value;
delaying the received symbol power value by one time unit to generate a delayed received symbol power value;
dividing the received symbol power value by the delayed received symbol power value to generate a received symbol power ratio;
comparing the received symbol power ratio with a demodulator decision threshold;
selecting one of the received symbol power value and the delayed received symbol power value;
dividing the quotient coded symbol product by the selected received symbol power value to generate a quotient decoded symbol value;
and outputting the quotient decoded symbol value.

10. A computer program product comprising:
a medium for embodying a computer program for input to a computer; and
a computer program embodied in said medium for causing the computer to perform the following functions for quotient coding modulation:
inputting a communications symbol value;
multiplying the communications symbol value by a delayed quotient coded symbol value to generate a first modulator output symbol value;
calculating a magnitude squared value of the first modulator output symbol value to generate a transmitted symbol power value;
calculating a complex conjugate of the communications symbol value;
dividing the delayed quotient coded symbol value by the complex conjugate of the communications symbol value to generate a second modulator output symbol value;
comparing the transmitted symbol power value with a modulator decision threshold;
selecting one of the first modulator output symbol value and the second modulator output symbol value;
outputting the selected output symbol value as the quotient coded symbol value;
and delaying the quotient coded symbol value by one time unit.

11. A computer program product comprising:
a medium for embodying a computer program for input to a computer; and
a computer program embodied in said medium for causing the computer to perform the following functions for quotient coding demodulation:
inputting a quotient coded symbol value;
delaying the quotient coded symbol input value by one time unit;
calculating a complex conjugate of the delayed quotient coded symbol value;
multiplying the complex conjugate of the delayed quotient coded symbol value by the quotient coded symbol value to generate a quotient coded symbol product;
squaring the magnitude of the quotient coded symbol value to generate a received symbol power value;
delaying the received symbol power value by one time unit to generate a delayed received symbol power value;
dividing the received symbol power value by the delayed received symbol power value to generate a received symbol power ratio;
comparing the received symbol power ratio with a demodulator decision threshold;
selecting one of the received symbol power value and the delayed received symbol power value;
dividing the quotient coded symbol product by the selected received symbol power value to generate a quotient decoded symbol value;
and outputting the quotient decoded symbol value.

12. A computer program product comprising:
a medium for embodying a computer program for input to a computer; and
a computer program embodied in said medium for causing the computer to perform quotient coding modulation by encoding transmitted symbols q(t) substantially according to the equation $$q(t) = \begin{cases} q(t-1)s(t) & \text{if } |q(t-1)s(t)| \leq \sqrt{P_{max}} \\ q(t-1)/\overline{s(t)} & \text{if } |q(t-1)s(t)| > \sqrt{P_{max}} \end{cases}$$

and to perform quotient coding demodulation by decoding received symbols $s_r(t)$ substantially according to the equation $$s_r(t) = \begin{cases} q_r(t)\overline{q_r(t-1)}/P_r(t-1) & \text{if } P_r(t) \geq \eta^2 P_r(t-1) \\ q_r(t)\overline{q_r(t-1)}/P_r(t) & \text{if } P_r(t) < \eta^2 P_r(t-1) \end{cases}$$

where q(t) and $q_r(t)$ are functions of time for transmitted and received symbols s(t) and $s_r(t)$ respectively at time t, $P_r(t)$ is instantaneous power at time t, $\eta$ is a function of two symbol amplitudes, and $P_{max}$ is peak transmitted power.

13. The computer program product of claim 12 wherein the two symbol amplitudes are two smallest symbol amplitudes A within a set of MQAM symbols defined by $s=A_n e^{2\pi j (P-1)/P}=A_n e^{j\Theta_P}$.

14. The computer program product of claim 12 wherein q(-1) is substantially equal to $\sqrt{(P_{max})}/2$.

* * * * *